United States Patent [19]
Long et al.

[11] Patent Number: 5,645,385
[45] Date of Patent: Jul. 8, 1997

[54] CAM ACTUATED CLAMPING TOOL

[75] Inventors: Michael Long, Rochester; James A. White, Conesus, both of N.Y.

[73] Assignee: Eastman Kodak Company, Rochester, N.Y.

[21] Appl. No.: 561,474

[22] Filed: Nov. 21, 1995

[51] Int. Cl.$^6$ ................................................. F16B 19/00
[52] U.S. Cl. ........................... 411/354; 411/344; 411/349
[58] Field of Search ........................... 411/354, 343–346, 411/349, 350, 549, 550, 356, 357; 24/498; 269/231, 229, 235; 403/321, 322, 343

[56] References Cited

U.S. PATENT DOCUMENTS

| 864,166 | 8/1907 | Herrick | 269/236 |
|---|---|---|---|
| 897,641 | 9/1908 | Moses | 269/236 |
| 1,310,538 | 7/1919 | Moore | 269/229 |
| 1,937,810 | 12/1933 | Carroll | 269/229 |
| 2,197,128 | 4/1940 | Harrison | 269/235 |
| 2,908,303 | 10/1959 | Schmidt | 269/235 |
| 2,978,803 | 4/1961 | Davies | 269/235 |
| 3,641,598 | 2/1972 | Feldstein | 403/321 |
| 4,010,669 | 3/1977 | Kloren | 85/1 T |
| 4,283,091 | 8/1981 | Enders | 301/9 DN |
| 4,655,644 | 4/1987 | Lane | 411/44 |
| 4,884,792 | 12/1989 | Rendahl | 269/236 |
| 5,156,508 | 10/1992 | Grisley | 411/354 |
| 5,257,855 | 11/1993 | Nagano | 301/110.5 |
| 5,465,473 | 11/1995 | Teeslink | 29/402.09 |
| 5,527,435 | 6/1996 | Arnau | 269/235 |

Primary Examiner—Steven N. Meyers
Assistant Examiner—Gary Estremsky
Attorney, Agent, or Firm—Mark G. Bocchetti

[57] ABSTRACT

A clamping device for clamping a punch block to a jaw of a punch press assembly where the action of clamping does not disturb the alignment between the punch block and the die. The device includes a pair of cams residing in a stacked relationship with each of the cams having a tapered aperture therethrough. A bolt passes through the tapered apertures of both cams and through a bore in the jaw to engage a threaded orifice in the punch block. Each of the cams has a generally cylindrical cam surface with a flat formed therein. Once the punch block is properly aligned with the die, the bolt is lightly tightened with the flats of the two cams in planar abutment with one another such that the cylindrical axes of the cams are separated by a first distance. The cams are then rotated with the lower one of the cams rolling on the surface of the jaw. Rotation of the cams moves the flats out of abutment with one another such that the axes of the cams become separated by a second distance which is greater than the first distance causing the upper one of the cams to bear against the head of the bolt thereby placing the bolt in tension while imparting no substantial force perpendicular to a longitudinal axis of the bolt.

22 Claims, 4 Drawing Sheets

CAM ACTUATED CLAMPING TOOL

BACKGROUND OF THE INVENTION

1. Field of the Invention

This invention relates generally to clamping devices, and more particularly, to clamping devices for use with punch and die sets.

2. Brief Description of the Prior Art

The tooling for punching holes into sheets for webs has traditionally consisted of a hardened punch which penetrated into a die fabricated from a softer material. The die had an opening which was considerably larger than the punch but which had been peened to be slightly smaller than the punch. The peened upper surface of the die was then ground flat leaving a thin ridge of material protruding into the die opening beyond the interior walls of the die. This ridge was broached to be the same size as the punch and exactly aligned with the punch by inserting the punch into the die after the two were pinned and bolted into the upper and lower punch jaws of the assembled punch press. This insured a tight fit between a particular punch and a die as mounted on a specific assembled punch press and overcame the difficult task of machining a die to match a punch. Further, the expensive machining problem of establishing a pin position tolerance for the punch on one punch jaw, the die on the other punch jaw, and the two jaws relative to each other through linear motion guideways such that the punch would not interfere with the die and would, in fact, be centered in the die was obviated.

The major drawback to fabricating dies of softer material was that the die did not last long before it needed to be resharpened. In addition, it was discovered that a larger clearance between the punch and die was desirable to improve cut quality on certain types of products so long as the clearance was uniform on all sides of the punch. Machine tool improvements allowed hard die materials to be machined to precisely match a punch contour with a prescribed amount of clearance. However, since the die was now made of a harder material, the method of broaching the die to precisely center the punch in the die was no longer possible. Instead, the die or the punch was rigidly mounted to one of the jaws of the assembled press while optical or other means were used to float the punch into centered alignment with the die. The punch, being in contact with but not yet fixed to the second punch jaw would be free to move in three degrees of freedom, two translational and one rotational. When the punch was centered, the screws for securing it to the punch jaw would be progressively tightened with great care to avoid shifting the punch on the jaw which would result in loss of the desired punch position. This was a delicate operation which often had to be repeated several times as numerous factors could cause the punch to shift two or three microns out of position. The friction between the threads and the punch tend to induce a rotation of the punch during tightening. Further, if the load bearing area of the head of the bolt is not flat and perpendicular to the axis of the bolt, or if the head seating area on the jaw is not flat and parallel to the head of the bolt, then a large lateral force can exist upon tightening which will cause the punch to translate slightly. Even the effort of applying a force to a wrench to tighten the bolts can cause some lateral displacement of the punch.

Cam actuated devices are well known for their advantages of quickly and securely clamping materials together in a single motion and are often used as compliments to or substitutes for screw-type fasteners. Prior art examples of cam actuated clamping devices for attaching one member to others are disclosed by U.S. Pat. No. 5,156,508 to Grisley and U.S. Pat. No. 5,257,855 to Nagano. These devices include a course adjustment means using a threaded draw bar to bring the parts to be clamped into sufficiently close abutment such that the limited additional displacement afforded by the cam brings the parts into a tightly clamped relationship. Both the Grisley and Nagano devices produce the cam actuated clamping motion by rotating a cam lobe having a cam surface which is increasingly eccentrically offset from the pivot point of the cam. However, upon actuating the cam, the sliding action of the cam surface against the abutting plate gives rise to a friction force having a magnitude on the order of 60 percent of the clamping force. This force, acting tangentially at the point of contact between the cam surface and the abutting plate is generally perpendicular to the axis of the tie rod thereby generating opposing laterally directed forces on the abutting plate and the tie bar. U.S. Pat. No. 4,010,669 to Kloren teaches a bolt tensioning arrangement comprising a plurality of ring-shaped elements having interacting conical surfaces. One of such ring-shaped elements is radially collapsible. A plurality of circumferentially spaced screws are uniformly tightened stepwise in circumferential order to axially draw the ring-shaped elements together which, in turn, put the bolt in axial tension. The result is a time consuming procedure requiring precision tightening of multiple screws in a prescribed sequence for each clamping bolt.

SUMMARY OF THE INVENTION

It is, therefore, an object of the present invention to provide a clamping device for clamping a punch or a die to a punch press jaw without applying any substantial lateral forces to the punch or the die during the clamping operation.

It is a further object of the present invention to provide a cam actuated clamping tool enabling the relatively quick and precise clamping of a punch or a die to a punch press jaw.

Yet another object of the present invention is to provide a tool which will allow the user to precisely secure a punch or a die to a punch press jaw such that the subsequent use of bolts to affix the punch or the die to the punch press jaw will not cause the punch or the die to translate on the surface of the jaw.

These and numerous other objects, features and advantages of the present invention will be readily apparent upon a review of the detailed description, claims, and drawings set forth hereinafter. These objects, features and advantages are accomplished through the use of a double cam device to apply a force which is substantially perpendicular to the abutting surfaces of the punch or die and the punch press jaw. There is a bolt which passes through both cams of the device and one of the jaw plates to engage either the punch or the die with the head of the bolts retaining the two cams in a stacked relationship. Each of the cams includes a tapered orifice therethrough which allows for a small amount of rotation of both cams despite the presence of the bolt which substantially pins the two cams together. At least one Or both of the cam surfaces includes an area of reduced radius such that through actuation of the double cam device, each of the cams rotates to a position on the respective cam surfaces Where the distance between cylindrical axes of the cams increases thereby causing the bolt to tighten. In such manner, the punch is securely clamped in exactly the desired position without the small displacements known to occur upon tightening of most bolted connections. The punch can then be affixed to the punch press jaw with a series of bolted connections without fear of displacing the punch from its clamped position.

DESCRIPTION OF THE PREFERRED EMBODIMENTS

Figure 1:
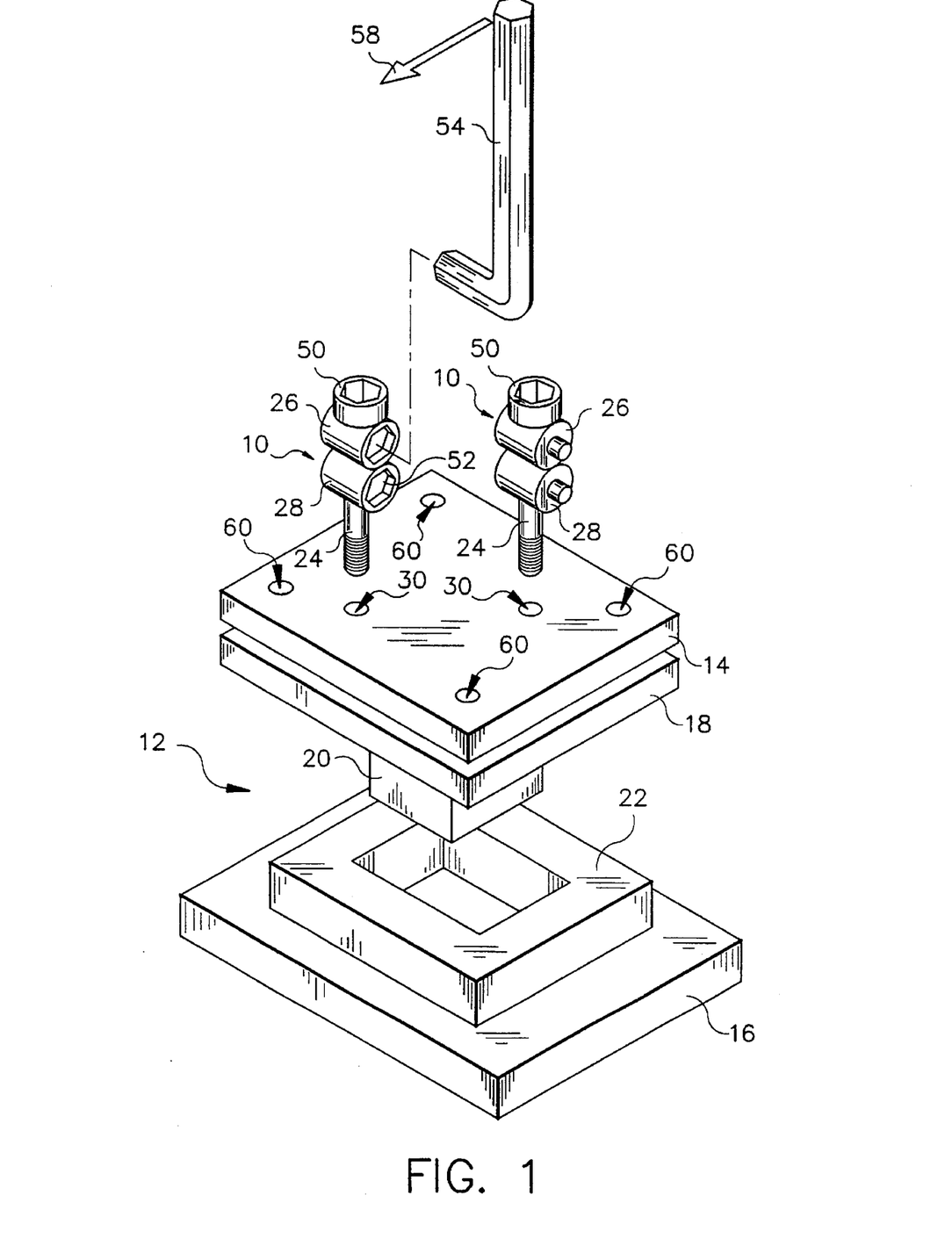
FIG. 1 is a perspective view of two of the clamping devices of the present invention shown exploded from a punch and die set.
Figure 2:
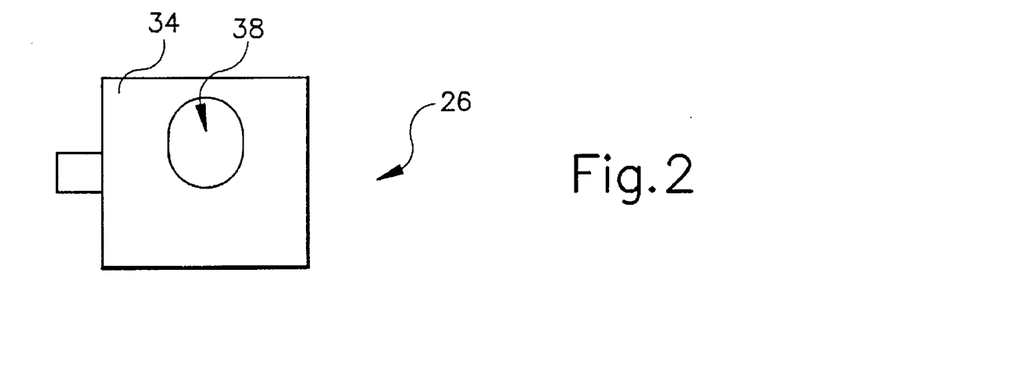
FIG. 2 is a top plan view of the upper cam.
Figure 3:
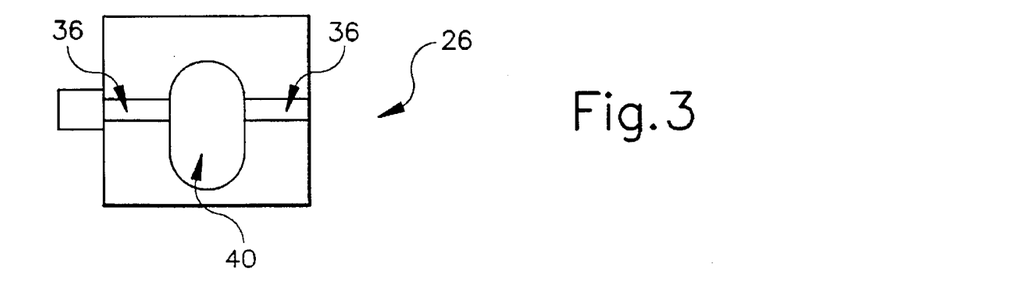
FIG. 3 is a bottom plan view of the upper cam.
Figure 4:
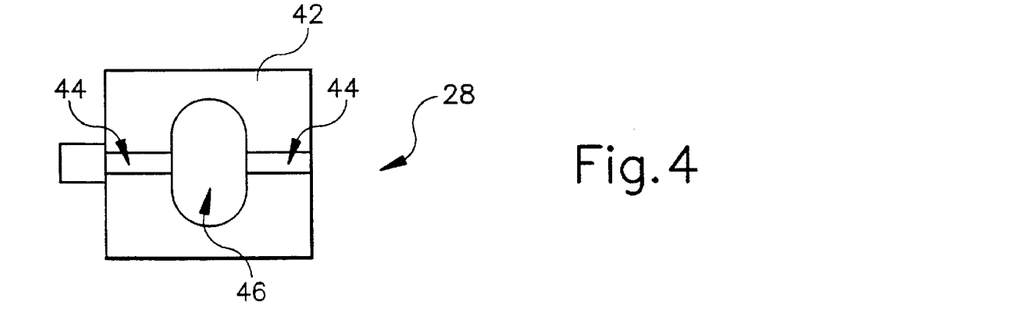
FIG. 4 is a top plan view of the lower cam.
Figure 5:
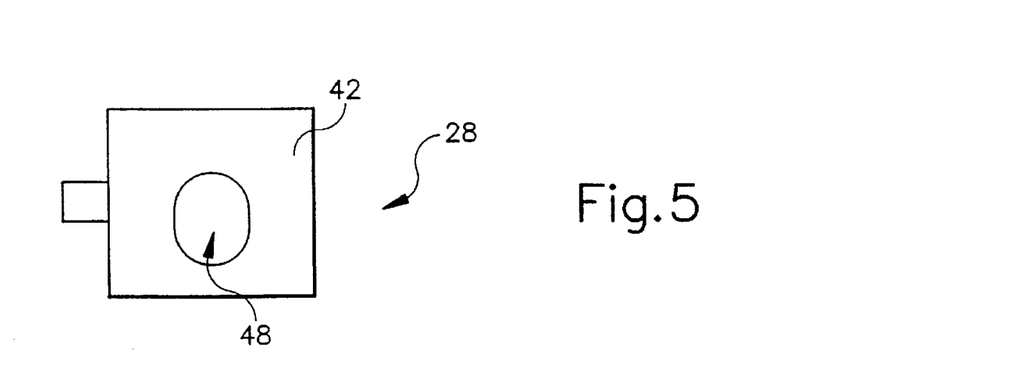
FIG. 5 is a bottom plan view of the lower cam.

Turning first to FIG. 1, there is shown a perspective view of a pair of the clamping devices 10 of the present invention exploded from a perspective schematic of a punch press assembly 12. The clamping devices 10 themselves are not shown in an exploded format. For simplicity, the punch press assembly 12 is depicted as including only an upper jaw 14, a lower jaw 16, a punch block 18 having punch 20 extending therefrom, and a die 22. In the operation of a punch press assembly 12, a film or web (not shown) is passed between punch block 18 and die 22. Upper jaw 14 reciprocates periodically such that punch block 18 inserts into die 22 thereby cutting a predetermined shape from the film or web.

Each clamping device 10 includes a bolt 24 which passes through an upper or first cam 26 and a lower or second cam 28. Bolt 24 also inserts through bore 30 in upper jaw 14 and threadably engages a threaded orifice 29 (see FIGS. 6, 7 and 8) in punch block 18. Upper and lower cams 26, 28 each have a tapered aperture 32 therethrough in which bolt 24 resides thereby creating a stacked cam relationship.

Figure 7:
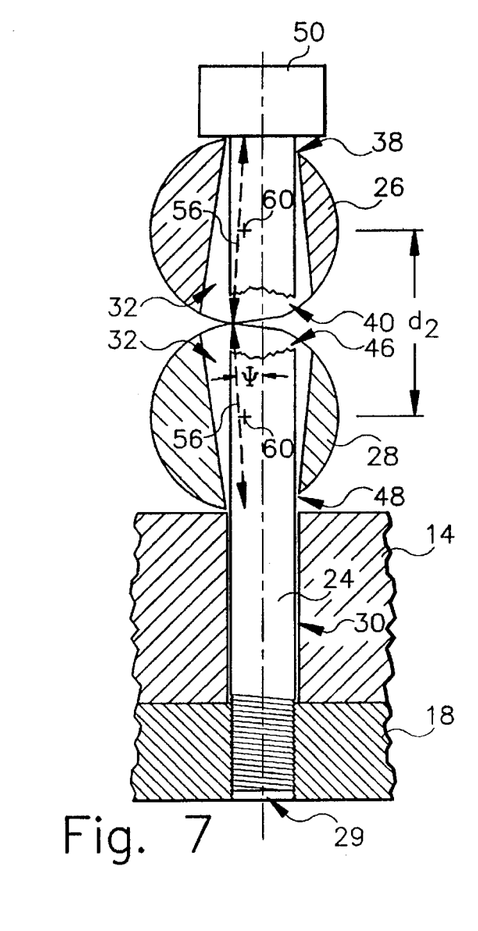
FIG. 7 is a cross-sectional view of the clamping device of the present invention in a partially clamped position.
Figure 8:
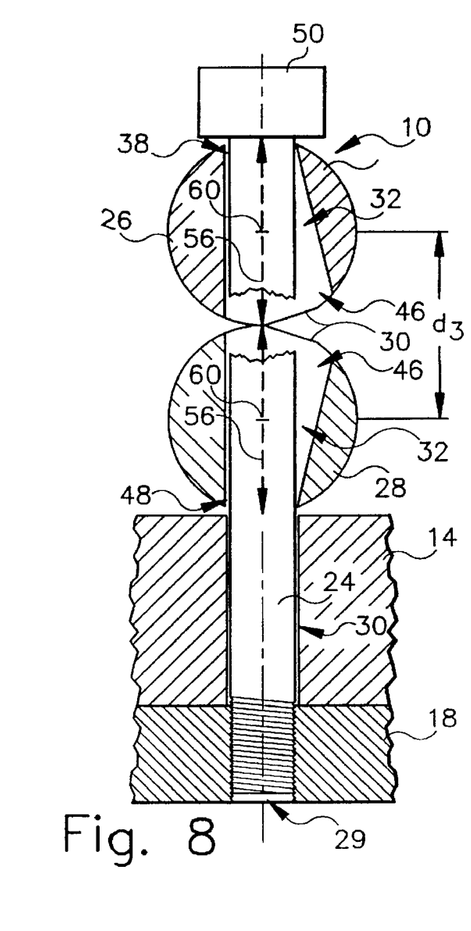
FIG. 8 is a cross-sectional view of the clamping device of the present invention in a fully clamped position.

Upper cam 26 includes an upper cam surface 34 which is substantially cylindrical with a flat region or area 36 of reduced radius machined therein. The tapered aperture 32 passes through upper cam 26 to thereby create a minor slot 38 and a major slot 40 in upper cam surface 34. Lower cam 28 is substantially a mirror image of upper cam 26 such that lower cam 28 includes a second cam surface 42 which is substantially cylindrical and has a flat region or area 44 of reduced radius machined therein. The tapered aperture 32 of lower cam 28 thereby creates a major slot 46 on the top thereof and a minor slot 48 on the bottom thereof. When upper cam 26 is stacked on lower cam 28, major slot 40 resides adjacent major slot 46. With upper cam 26 and lower cam 28 residing in an unclamped position, flats 36, 44 reside in planar abutment with one another (see FIG. 6). Upper and lower cams 26, 28 each have a longitudinal axis 45 shown as a line in FIG. 1 and as a plus sign (+) in FIGS. 6 through 8. In the unclamped position with the flats 36, 44 abutting one another, the longitudinal axes 45 are separated by a first distance $d_1$. In the fully clamped position (as depicted in FIG. 8) with the flats 36, 44 no longer abutting one another, the longitudinal axes 45 are separated by a second distance $d_2$ which is greater than the first distance $d_1$.

Figure 6:
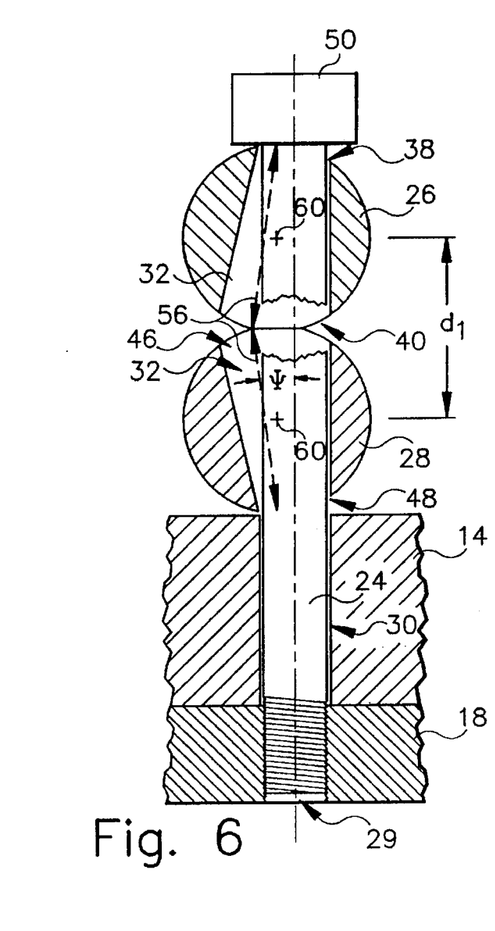
FIG. 6 is a cross-sectional view of the clamping device of the present invention in an unclamped position.

In operation, the punch block 18 is positioned on upper jaw 14 and slideably held against the reference surface of upper jaw 14 by light finger tightening of bolt 24 acting through the flats 44 of upper and lower cams 26, 28. When the desired position for punch block 18 is achieved on the reference surface of upper jaw 14 such that the punch block 18 is in alignment with the die 22, a torque is applied to at least one of upper and lower cams 14, 16 thereby causing both cams to roll from a slightly off center position under the head 50 of bolt 24 to a centered position aligned with the axis of bolt 24. Cams 26, 28 are provided with hexagonal ports 52 allowing for insertion of a hexagonal wrench 54 which may be used to induce rotational movement of either upper or lower cam 26, 28. Thus, for example, when upper cam 26 is induced to rotate through use of hexagonal wrench 54, the initial contact pressure between the cam surfaces 34, 42 induces the lower cam 28 to roll towards center at the same time as the upper cam 26. The lines of action 56 of the clamping forces as shown in FIGS. 6–8 pass through the contact points between the reference surface of upper jaw 14, upper and lower cams 26, 28 and the bolt head 50. As the upper and lower cams 26, 28 rotate from the unclamped position depicted in FIG. 6 through the partially clamped positioned depicted in FIG. 7 to the fully clamped position depicted in FIG. 8, the lines of action 56 of the clamping forces become parallel and colinear, and the bolt 24 is put into tension and begins to stretch.

Preferably, if maximum clamping force is desired, the cylindrical length of cams 26, 28 should be such that the hexagonal ports 52 do not penetrate to a region beneath the head 50 of bolt 24. Allowing the hexagonal ports 52 to penetrate to a region beneath the head 50 of the bolt 24 can result in a nonconstant and reduced stiffness of the cam surfaces yielding reduced clamping force.

It will be recognized by those skilled in the art that hex ports 52 can be replaced by any common driver interface such as a star or box driver interface. Further, the driver interface on the cams 26, 28 can be male or female. Alternatively, one of the cams 26, 28 can made with a wrench extension which is integral therewith. In addition, since only one of the cams 26, 28 acts as the driver and the other of the cams 26, 28 is driven, only one of the cams 26, 28 needs to have a driver interface or means for rotation incorporated therein.

The table below illustrates the forces developed in the clamping device 10 of the present invention for an example where a 10–32 bolt is supported on two 0.5 inch diameter cams 26, 28, each having a 0.07 inch wide flat 36, 44 in one location on its cam surface 34, 42. The planar surface of each flat 36, 44 is perpendicular to a radius of its respective cam 26, 28. Unrestrained, this would cause a 0.005 inch lift to the head 50 of bolt 24 thereby developing 1480 pounds of clamping force and a 0.002 inch compression of upper and lower cams 26, 28 and the reference surface of upper jaw 14. In the initial position depicted in FIG. 6, the lines of force 56 are four degrees out of parallel (angle $\Psi$) with the axis of the bolt 24. In this position, the component of the force perpendicular to the bolt 24 is 0.07 times as great as the on-axis clamping force component. Thus, the coefficient of friction between the punch block 18 and the reference surface of upper jaw 14 must be at least 0.07 in order to prevent undesired movement during clamping. This value is so low that, as a matter of practicality, there is no chance of movement under normal unlubricated or lightly lubricated conditions.

TABLE

| Angle Ψ Degrees | Bolt Rise Inches | Clamping Force for 12 in-lb pounds | Transverse Force for 12 in-lb pounds | Mechanical Advantage | Minimum Friction Coefficient |
|---|---|---|---|---|---|
| 4 | 0 | 171 | 12 | 14 | .070 |
| 2.5 | .0031 | 276 | 12 | 23 | .043 |
| 1.5 | .0043 | 459 | 12 | 38 | .026 |
| .5 | .0049 | 1375 | 12 | 115 | .009 |
| 0 | .005 |  | 0 | ∞ | 0 |

Reducing the lengths of flats 36, 44 on the cam surfaces 34, 42 reduces the unrestrained lift height and also reduces the minimum required coefficient of friction to ensure no movement of punch block 18 during clamping. Note that, in FIG. 1, if the force applied through wrench 54 is in the direction of arrow 58, then such force will tend to cancel the undesirable horizontal component of the clamping force to further reduce the minimum required coefficient of friction. As the upper and lower cams 26, 28 are rotated through eight degrees in this example, the lines of action 56 of the clamping force and the points of application of that force become aligned with the axis of the bolt 24 to develop a pure tension force in the bolt 24 without the usual torsion of stresses which are typically developed when applying a tightening torque to a bolt. This lack of torsional stress permits a higher tensile stress to be applied and results in higher possible clamping forces.

Comparing the clamping device 10 of the present invention to a normal bolted connection using the same 10–32 bolt shows that for an uneven contact between the bolt and the reference surface, the minimum coefficient of friction required to prevent movement is between 0.24 and 0.4 depending on what part of the underside of the bolt head contacts the reference surface. These values are dangerously close to the experimentally determined coefficient of friction between tungsten carbide and steel in a clean, dry condition of 0.5 understanding that finger oils and other contaminants are likely to be present on the reference surface or the bolt head or both. It should be noted that while switching from hardened steel punches to tungsten carbide brought an improvement in punch hardness and punch life, it also resulted in a 35 percent reduction in the coefficient of friction relative to steel against steel. Therefore, punch clamping techniques which were adequate for steel against steel may not be adequate when the materials to be clamped are changed.

Once the clamping devices 10 of the present invention are used to firmly position the punch block 18 on upper jaw 14, additional bolts (not shown) can be inserted through orifices 60 to threadably engage punch block 18. Such additional bolts can be tightened without fear of causing punch block 18 to translate on upper jaw 14. Once the additional bolts have been tightened, the clamping devices 10 of the present invention can be removed prior to operation of the punch press assembly 12. Although it is possible to use only a single clamping device 10 of the present invention, it is preferable that at least two of the clamping devices 10 of the present invention be used to secure a punch block 18 to an upper jaw 14.

Figure 9:
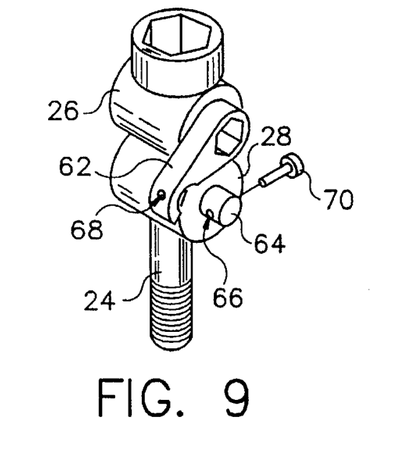
FIG. 9 is a perspective view of the clamping device of the present invention including a locking mechanism.

If it is desired to operate the punch press assembly 12 with the clamping devices 10 installed, it is necessary to lock the cams 26, 28 in position such that they will not rotate during machine operation. This can be accomplished with a locking arm 62 pivotally affixed to the upper cam 26 (see FIG. 9). The locking arm 62 pivots to interact with cylindrical member 64 which projects from lower cam 28. Cylindrical member 64 has bore 66 therethrough which may be threaded. Locking arm 62 includes an orifice 68. Locking arm 62 can be affixed to cylindrical member 64 by means of pin or screw 70 inserted through both orifice 68 and bore 66 thus insuring that cams 26, 28 can no longer rotate.

Although, as described herein, the clamping devices 10 of the present invention are used to secure the punch block 18 to jaw 14 once the punch block 18 has been properly positioned, it will be recognized by those skilled in the art that the same device can be used to position die 22 on lower jaw 16.

Although in the preferred embodiment both cams 26, 28 include a flat 36, 44, the present invention can be practiced with only one of the cams 26, 28 including an area of reduced radius. The second cam can have a cam surface which is completely cylindrical.

Figure 10:
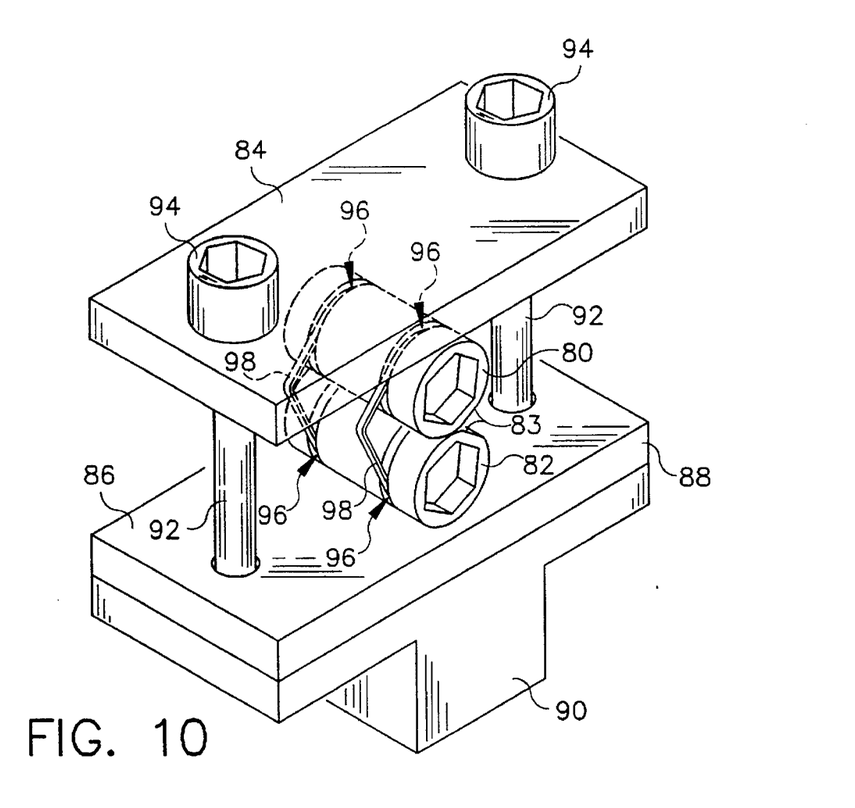
FIG. 10 is a perspective view of a first alternative embodiment of the clamping device depicted in FIGS. 1 through 8.

The fastener means used in the preferred embodiment is a bolt 24 which passes through the tapered apertures 32 of the cams 26, 28. However, it will be recognized by those skilled in the art that the present invention can be practiced using a alternative cam/fastener interface. For example, there is shown in FIG. 10 an alternative stacked cam embodiment which can be used to practice the clamping device of the present invention. Such alternative embodiment includes an upper cam 80 and lower cam 82 both of which can be solid (no tapered apertures therethrough such as those depicted in the embodiment shown in FIGS. 1 through 8). As with the preferred embodiment, cams 80, 82 each include an area of reduced radius or flat 83. Cams 80, 82 reside between a bridge structure 84 and the upper or non-reference surface 86 of a jaw 88. The bridge structure 84 is joined to the punch block 90 by two bolts 92 having heads 94. The stacked cams 80, 82 reside between bridge structure 84 and the non-reference surface 86 of jaw 88.

The clamping device 10 of the present invention may include a means for providing initial alignment of the cams 80, 82 to ensure that the flats 83 are properly oriented. As shown in FIG. 10, each of the cams 80, 82 can be provided with a pair of annular grooves 96 such that the annular grooves 96 of upper cam 80 align with the annular grooves 96 of lower cam 82. A spring clip 98 resides within each pair of the annular grooves 90 biasing the cams 80, 82 toward one another. In such manner the spring clip 98 also maintains the longitudinal axes of the cams 80, 82 parallel to one another and ready for rotation to thereby generate the desired clamping force.

Figure 11:
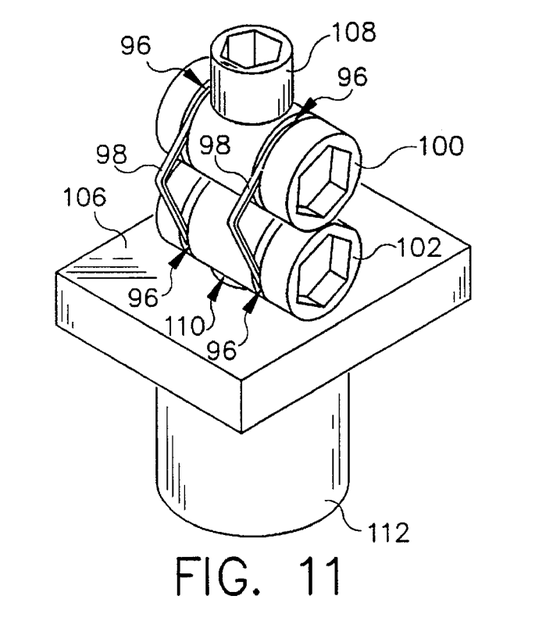
FIG. 11 is a perspective view of a clamping device of the present invention similar to that depicted in FIG. 1 and including an alignment/biasing means for the upper and lower cams.

The same biasing means discussed above with regard to the alternative embodiment of FIG. 10 can also be used in conjunction with the preferred embodiment depicted in FIG. 1. As shown in FIG. 11, upper cam 100 and lower cam 102 reside in a stacked relationship on the non-reference surface of 104 of punch jaw 106. A bolt 108 passes through the tapered apertures (not shown) of the upper and lower cams 100, 102 and through a bore 110 in jaw 106 to engage punch block 112. Each of the cams 100, 102 can be provided with a pair of annular grooves 96 such that the annular grooves 96 of upper cam 100 align with the annular grooves 96 of lower cam 102. A spring clip 98 resides within each pair of the annular grooves 96 biasing the cams 100, 102 toward one another. In such manner the spring clip 98 also maintains the longitudinal axes of the cams 100, 102 parallel to one another and ready for rotation to thereby generate the desired clamping force.

From the foregoing, it will be seen that this invention is one well adapted to obtain all of the ends and advantages herein above set forth together with other ends and advantages which are apparent and which are inherent to the invention.

It will be understood that certain features and subcombinations are of utility and may be employed with reference to other features and subcombinations. This is contemplated by and is within the scope of the claims.

As many possible embodiments may be made of the present invention without departing from the scope thereof, it is to be understood that all of the matter herein set forth and shown in the accompanying drawings is to be interpreted as illustrative and not in a limiting sense.

What is claimed is:

1. A clamping device comprising:
   (a) a pair of stacked cams, each of said stacked cams having a cam surface, said cam surfaces engaging one another, each of said stacked cams capable of rotational movement about a corresponding axis, said axes being separated by a first distance;
   (b) a bolt having a threaded end a head at an opposite end, said bolt passing through said pair of stacked cams and through a first object with said threaded end engaging a second object;
   (c) means for rotating said pair of stacked cams, said cam surfaces being shaped such that through rotation of said pair of stacked cams said axes become separated by a second distance which is greater than said first distance causing one of said stacked cams to bear against said head thereby placing said bolt in tension while imparting no substantial force perpendicular to a longitudinal axis of said bolt.

2. A clamping device comprising:
   (a) a first cam having a first cam surface;
   (b) a second cam having a second cam surface, said first cam surface abutting said second cam surface, each of said cams capable of rotational movement about a respective axis, said axes being separated by a first distance;
   (c) a fastener means for affixing said clamping device to a second object, said fastener means maintaining said cam surfaces in contact with one another, said fastener means passing through a first object and engaging said second object;
   (d) means for imparting rotational movement to said first and second cams, said cam surfaces being shaped such that through rotation of said first and second cams said axes become separated by a second distance which is greater than said first distance thereby tensioning said fastener means to clamp said first and second objects together, rotation of said first and second cams imparting no substantial force perpendicular to a longitudinal axis of said fastener means.

3. A clamping device as recited in claim 2 wherein:
   said second cam is in contact with said first object, rotation of said first and second cams causing said second cam to roll a short distance on a planar surface of said first object.

4. A clamping device as recited in claim 3 wherein:
   said first and second cam surfaces are generally cylindrical with a flat formed in at least one of said first and second cam surfaces.

5. A clamping device as recited in claim 4 wherein:
   said first and second cams each have a tapered aperture therethrough thus forming a minor slot and a major slot in each of said cam surfaces, said first and second cams positioned such that said major slots reside adjacent one another, said fastener means being a bolt passing through both of said tapered apertures.

6. A clamping device as recited in claim 5 wherein:
   said first and second cams reside in an initial position where said flat portion of said first cam engages said flat portion of said second cam.

7. A clamping device as recited in claim 6 wherein:
   said fastener means is a bolt passing through both of said tapered apertures, said tapered apertures allowing said first and second cams freedom to partially rotate about their respective axes with said bolt remaining generally perpendicular to said planar surface.

8. A clamping device for clamping a punch block in proper alignment to a punch jaw, said clamping device comprising:
   (a) a first cam having a first cam surface;
   (b) a second cam having a second cam surface, said first cam surface abutting said second cam surface, each of said cams capable of rotational movement about a respective axis, said axes being parallel and separated by a first distance;
   (b) a fastener means passing through said first and second cams, said fastener means adapted to pass through said punch jaw and engage said punch block;
   (c) means for imparting rotational movement to said first and second cams, said cam surfaces being shaped such that through rotation of said first and second cams said axes become separated by a second distance which is greater than said first distance thereby tensioning said fastener means for applying a damping force to said punch jaw and said punch block, rotation of said first and second cams imparting no substantial force perpendicular to a longitudinal axis of said fastener means.

9. A clamping device as recited in claim 8 wherein:
   said second cam is in contact with a planar surface of said punch jaw, rotation of said first and second cams causing said second cam to roll a short distance on said planar surface.

10. A clamping device as recited in claim 8 wherein:
    said first and second cam surfaces are generally cylindrical with a flat portion formed in each.

11. A clamping device as recited in claim 8 wherein:
    said first and second cams each have a tapered aperture there through thus forming a minor slot and a major slot in each of said cam surfaces, said first and second cams positioned such that said major slots reside adjacent one another.

12. A clamping device as recited in claim 11 wherein:
    said first and second cams reside in an initial position where said flat portion of said first cam engages said flat portion of said second cam.

13. A clamping device for clamping a punch block in proper alignment to a punch jaw, said clamping device as recited in claim 11 wherein:
    said fastener means is a bolt passing through both of said tapered apertures, said tapered apertures allowing said first and second cams freedom to partially rotate about their respective axes with said bolt remaining generally perpendicular to said planar surface.

14. A clamping device for clamping a punch block having an orifice therethrough in proper alignment to a jaw reference surface of a punch jaw, said clamping device comprising:

(a) a pair of cams with abutting, interacting cam surfaces, each of said cams capable of rotational movement about a respective axis, said axes being separated by a first distance;

(b) a fastener means adapted to attach said punch block to said punch jaw, said fastener means including a bearing surface and at least one bolt adapted to pass through said punch jaw and engage said punch block, an upper one of said cams abutting said bearing surface, a lower one of said cams adapted to abut said jaw reference surface, said axes becoming separated by a second distance which is greater than said first distance through rotation of said pair of cams thereby tensioning said fastener means, rotation of said pair of cams imparting no substantial force parallel to the plane of said jaw reference surface.

15. A clamping device for clamping a punch block having a threaded bore therein to a jaw reference surface having an orifice therethrough, the threaded bore being substantially aligned with the orifice, said clamping device comprising:

(a) an upper cam having a generally cylindrical surface with a first flat formed therein, said upper cam having a first tapered aperture therethrough forming a first minor slot in said generally cylindrical surface and a first major slot in said generally cylindrical surface;

(b) a lower cam having a generally cylindrical surface with a second flat formed therein, said lower cam having a second tapered aperture therethrough forming a second minor slot in said generally cylindrical surface and a second major slot in said generally cylindrical surface, said upper and lower cams residing in stacked relationship with said lower cam abutting said reference jaw and said first major slot residing adjacent said second major slot and said flats residing in planar abutment with one another;

(c) a bolt passing through said first and second tapered apertures, said bolt adapted to pass through said orifice, said bolt adapted to engage said threaded bore;

(d) means for rotating said upper and lower cams such that said first and second flats are no longer in contact and said first and second generally cylindrical surfaces are in contact wherein, said lower cam is adapted to rolling on said reference jaw surface when said upper and lower cams are rotated such that no substantial force parallel to the plane of said reference jaw surface is generated.

16. A clamping device as recited in claim 14 further comprising:

biasing means for urging said pair of cams toward each other and for maintaining said axes parallel to one another.

17. A clamping device as recited in claim 16 wherein:

said biasing means includes a pair of spring clips each encircling said pair of cams and residing in aligned annular grooves in said pair of cams.

18. A clamping device as recited in claim 14 further comprising:

means for locking said pair of cams against further rotational movement when said axes of said pair of cams becomes separated by said second distance.

19. A clamping device for clamping a first object having an orifice therethrough to a second object having a threaded bore therein, said clamping device comprising:

(a) a pair of stacked cams, each of said pair having a cam surface, said cam surfaces engaging one another, each of said stacked cams capable of rotational movement about a corresponding axis, said axes being separated by a first distance;

(b) a bolt having a threaded end and a head at an opposite end, said bolt passing through said pair of stacked cams, said bolt adapted to pass through said orifice through said first object, said threaded end for attachment to said threaded bore;

(c) means for rotating said pair of stacked cams, said cam surfaces being shaped such that through rotation of said pair of stacked cams said axes become separated by a second distance which is greater than said first distance causing one of said stacked pair of cams to bear against said head thereby placing said bolt in tension while imparting no substantial force perpendicular to a longitudinal axis of said bolt.

20. A clamping device in combination with a punch block and a jaw reference surface comprising:

(a) a threaded bore through said punch block:

(b) an orifice through said jaw reference surface, said orifice in substantial alignment with said threaded bore;

(c) an upper cam having a generally cylindrical surface with a first flat formed therein, said upper cam having a first tapered aperture therethrough forming a first minor slot in said generally cylindrical surface and a first major slot in said generally cylindrical surface;

(d) a lower cam having a generally cylindrical surface with a second flat formed therein, said lower cam having a second tapered aperture therethrough forming a second minor slot in said generally cylindrical surface and a second major slot in said generally surface, said upper and lower cams residing in stacked relationship with said lower cam abutting said reference jaw and said first major slot residing adjacent said second major slot and said flats residing in planar abutment with one another;

(e) a bolt passing through said first and second tapered apertures and said orifice and engaging said threaded bore;

(f) means for rotating said upper and lower cams such that said first and second flats are no longer in contact and said first and second generally cylindrical surfaces are in contact, said lower cam rolling on said reference jaw surface when said upper and lower cams are rotated such that no substantial force parallel to the plane of said reference jaw surface is generated.

21. A clamping device in combination with a punch block and a punch jaw for clamping said block in proper alignment to a jaw reference surface of said punch jaw, said combination comprising:

(a) a a pair of cams with abutting, interacting cam surfaces, each of said cams capable of rotational movement about a respective axis, said axes being separated by a first distance;

(b) a fastner means for attaching said punch block to said punch jaw, said fastner means including a bearing surface and at least one bolt which passes through said punch jaw and engages said punch block, said pair of cams residing between said bearing surface and said punch jaw, said axes becoming separated by a second distance which is greater than said first distance through rotation of said pair of cams thereby tensioning said fastner means to firmly clamp said punch block to said punch jaw, rotation of said pair of cams imparting no substantial force parallel to the plane of said jaw reference surface.

22. A clamping device for clamping a first object to a second object comprising:

(a) a first cam having a first cam surface;

(b) a second cam having a second cam surface, said first cam surface abutting said second cam surface, each of said cams capable of rotational movement about a respective axis, said axes being separated by a first distance;

(c) a fastener means for affixing said clamping device to said second object, said fastener means maintaining said cam surfaces in contact with one another, said fastener means adapted to threadably engage said second object;

(d) means for imparting rotational movement to said first and second cams, said cam surfaces being shaped such that through rotation of said first and second cams said axes become separated by a second distance which is greater than said first distance thereby tensioning said fastener means when said fastener means is threadably engaged with said second object, rotation of said first and second cams imparting no substantial force perpendicular to a longitudinal axis of said fastener means.

\* \* \* \* \*

UNITED STATES PATENT AND TRADEMARK OFFICE
CERTIFICATE OF CORRECTION

PATENT NO. : 5,645,385
DATED : July 8, 1997
INVENTOR(S) : Michael Long, et al

It is certified that error appears in the above-indentified patent and that said Letters Patent is hereby corrected as shown below:

| | |
|---|---|
| Col. 7, line 25 | After "threaded end" insert --and-- |
| Col. 8, line 34 | Delete "damping" and in place thereof insert --clamping--. |
| Col. 9, line 43 | Delete "rolling" and in place thereof insert --roll--. |

Signed and Sealed this

Seventh Day of October, 1997

Attest:

BRUCE LEHMAN

Attesting Officer    Commissioner of Patents and Trademarks